Figure 1:
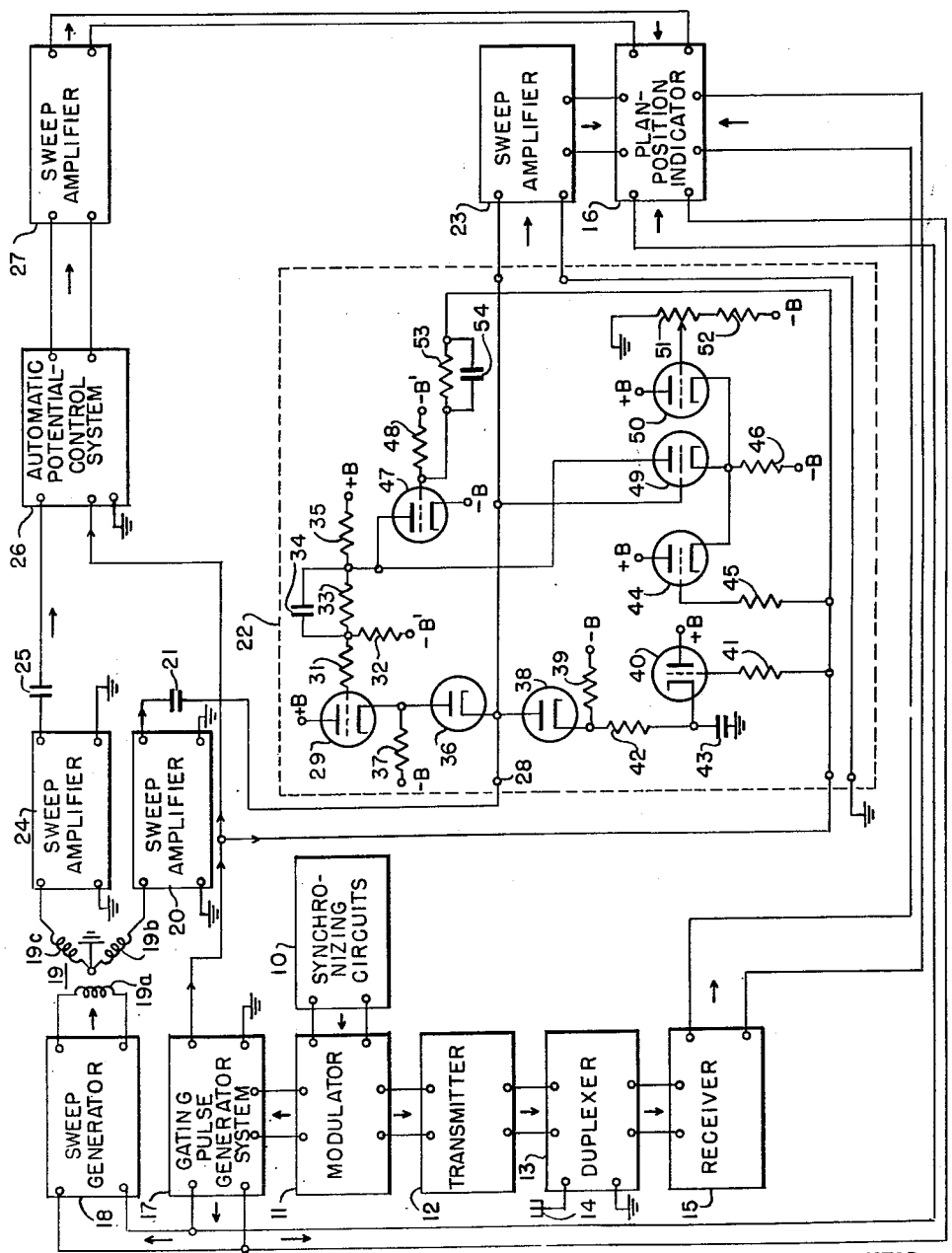

April 13, 1954 H. ARKUS 2,675,472
AUTOMATIC POTENTIAL-CONTROL SYSTEM
Filed Sept. 13, 1951 2 Sheets-Sheet 2

INVENTOR.
HENRY ARKUS
BY Laurence B Dodds
ATTORNEY

Patented Apr. 13, 1954

2,675,472

UNITED STATES PATENT OFFICE 2,675,472

AUTOMATIC POTENTIAL-CONTROL SYSTEM

Henry Arkus, Brooklyn, N. Y., assignor to Hazeltine Research, Inc., Chicago, Ill., a corporation of Illinois Application September 13, 1951, Serial No. 246,413

12 Claims. (Cl. 250—27)

General

The present invention relates to automatic potential-control systems and, more particularly, to such control systems of the type which automatically maintains the potential at a point in the system at a predetermined value during given intervals. Such a control system has particular utility in a radar system and, hence, will be described in that environment.

Heretofore, so-called "clamp circuits" have commonly been utilized to maintain the potential at a point in a circuit at a predetermined value despite tendencies of the potential to vary positively or negatively. Such clamp circuits, when utilizing tubes of moderate size, have had output impedances of the order of a few hundred ohms. To provide lower output impedances for these circuits, it has been proposed to utilize larger tubes having heavier current-carrying capacities. However, because such tubes are not readily disabled and require sources of large amounts of power, the proposed circuits are not satisfactory for some radar applications requiring, for example, a gated potential-control system for controlling during given intervals the potential at a point in a sweep amplifier of a radar system utilizing a gated sweep generator and for isolating that point from a source of potential during other intervals to stabilize the operation of the sweep amplifier.

It is an object of the present invention, therefore, to provide a new and improved automatic potential-control system which avoids one or more of the above-mentioned disadvantages and limitations of systems heretofore proposed.

It is another object of the invention to provide a new and improved control system for automatically maintaining the potential at a point in the system at a predetermined value during given intervals and for isolating that point from a source of potential during other intervals.

It is still another object of the invention to provide for use in a radar system a new and improved control system for automatically maintaining the potential at a point in the radar system at a predetermined value during given intervals by means of which the operation of a sweep amplifier of the radar system may be stabilized.

In accordance with a particular form of the invention, in a gated system having one operating phase during predetermined gating intervals and another operating phase during the intervening intervals, a control system for automatically maintaining the potential at a given point in the gated system at a predetermined value during the intervening intervals comprises a signal-responsive potential-supply circuit having a controllable potential-current flow characteristic and signal-responsive circuit means coupled in circuit with the aforesaid supply circuit and the given point. The control system also includes a circuit for supplying to the aforesaid circuit means repetitive gating pulses for rendering the same nonconductive and means including said signal-responsive circuit means for isolating the given point from the potential-supply circuit within the control system during the gating intervals. The control system further includes a circuit coupled to the given point and the aforesaid potential-supply circuit and responsive to deviations of the potential at the given point from the aforesaid predetermined value during the intervening intervals for applying to the potential-supply circuit a control signal variable in magnitude during the intervening intervals and determined during the intervening intervals by the potential at the given point for controlling the aforesaid characteristic of the potential-supply circuit to maintain the potential at the given point at the predetermined value during the intervening intervals.

Also in accordance with a particular form of the invention, in a gated system having one operating phase during predetermined gating intervals and another operating phase during the intervening intervals, a control system for automatically maintaining the potential at a given point in the gated system at a predetermined value during the intervening intervals comprises a potential-supply circuit and a two-part voltage divider coupled in a series relation with the potential-supply circuit. One part includes potential-responsive first circuit means of variable impedance for controlling current flow therethrough and the other part includes a second circuit means of substantial impedance. The control system includes potential-responsive third circuit means coupled between the potential-supply circuit and the aforesaid given point. The control system also includes a circuit for applying to the aforesaid third circuit means repetitive gating potential pulses for rendering the same nonconductive and means including the aforesaid third circuit means for isolating the given point from the supply circuit within the control system during the gating intervals. The control system also includes a circuit coupled between the given point and the first circuit means and responsive to deviations of the potential at the given point from the aforesaid predetermined value during the intervening intervals for applying to the first circuit means a control potential variable in magnitude during the intervening intervals and determined during the intervening intervals by the potential at the given point for controlling the impedance of the first circuit means to maintain the potential at the given point at the predetermined value during the intervening intervals.

For a better understanding of the present invention, together with other and further objects thereof, reference is had to the following description taken in connection with the accompanying drawings, and its scope will be pointed out in the appended claims.

Figure 2:
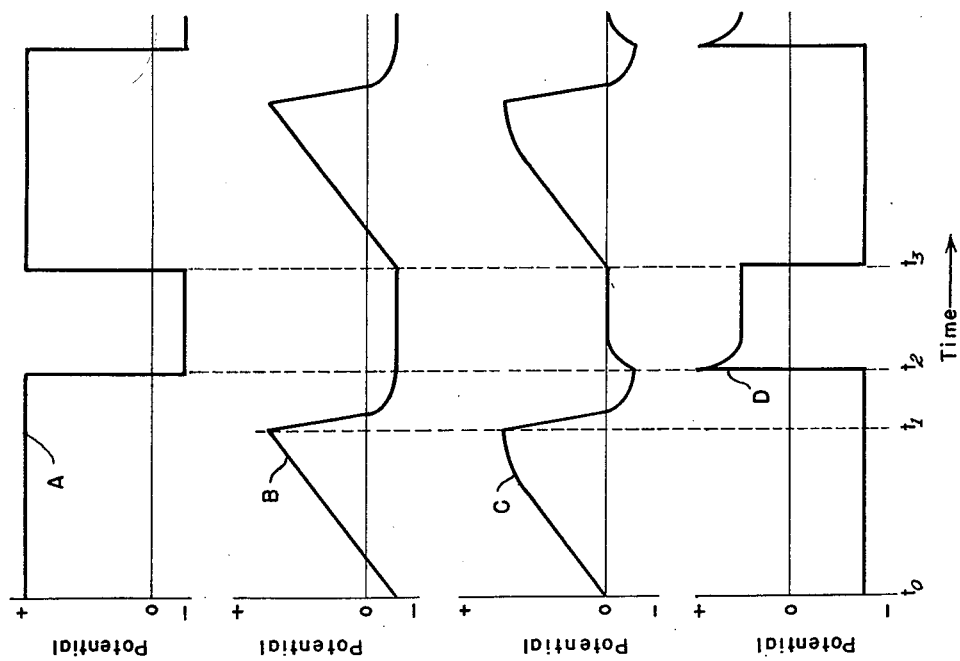

In the accompanying drawings, Fig. 1 is a schematic circuit diagram of a radar system including an automatic potential-control system constructed in accordance with a particular form of the invention; and Fig. 2 is a graph representing the potential-time characteristics of the output signals of various units of the Fig. 1 radar system to aid in explaining the invention.

*General description of Fig. 1 radar system*

Referring now more particularly to Fig. 1, there is represented a gated radar system having one operating phase during predetermined gating intervals and another operating phase during the intervening intervals including an automatic potential-control system in accordance with the invention. The radar system comprises the usual synchronizing circuits 10 which may include a suitable repetition rate oscillator and pulse generator circuits well known in the art. The synchronizing circuits 10 are coupled through a modulator 11 of conventional construction to a transmitter 12 for transmitting pulse-modulated radar signals. The transmitter 12 is coupled in a usual manner to an antenna 14 through a duplexer 13 which may be of any suitable type, such as one described in Chapter XI of the text "Principles of Radar," second edition, by the Massachusetts Institute of Technology Radar School Staff, McGraw-Hill, 1946. The antenna 14 is also coupled through the duplexer 13 to a receiver 15 of conventional construction for receiving and detecting echo signals intercepted by the antenna 14 and for applying with amplification the video-frequency modulation components of these signals to an input circuit of a plan-position indicator 16 which may comprise a cathode-ray tube of a well-known type.

The radar system also includes a gating pulse generator system 17 coupled to an output circuit of the modulator 11 for generating gating pulses in response to trigger pulses applied thereto by the modulator. The gating pulse generator system 17 may be similar to that disclosed and claimed in the copending application Serial No. 246,456 of Jasper J. Okrent, entitled "Control System for Automatically Varying the Duration of Repetitive Pulses," and filed September 13, 1951. An output circuit of the gating pulse generator system 17 is coupled to a sweep generator 18 for generating saw-tooth pulses during the intervals of the gating pulses applied thereto. This output circuit of the unit 17 is also coupled to the cathode-ray tube of the indicator 16 for rendering that tube conductive during the sweep time of the output signal of the sweep generator 18. Another output circuit of the unit 17 is coupled to an automatic potential-control system 22 constructed in accordance with the invention and more fully described hereinafter and to an automatic potential-control system 26 similar to the unit 22.

The output circuit of the sweep generator 18 is coupled to the rotor winding 19a of a conventional signal resolver, such as a synchro 19, having two stator windings 19b and 19c displaced 90° from each other for resolving the output signal of the sweep generator 18 into two components having amplitudes which individually vary in accordance with the sine and cosine of the angle of the rotor winding 19a relative to a predetermined reference. The rotor winding 19a ordinarily is positioned in accordance with the position of the antenna 14 by any suitable means (not shown). The winding 19b is coupled to the input circuit of a suitable sweep amplifier 20 of one or more stages, which is, in turn, coupled to a sweep amplifier 23 through a coupling condenser 21 and the control system 22. The output circuit of the sweep amplifier 23 is coupled to a deflection circuit of the plan-position indicator 16 for supplying one component of a sweep signal to that indicator.

The stator winding 19c of the synchro 19 is coupled in a similar manner through a sweep amplifier 24, a condenser 25, the automatic potential-control system 26, constructed in accordance with the invention, and a sweep amplifier 27 to another deflection circuit of the plan-position indicator 16 for supplying another component of the sweep signal to that indicator.

Units 24, 26, 27 and the coupling condenser 25 preferably are of construction similar to that of units 20, 22, 23 and the coupling condenser 21, respectively. Units 10–13, inclusive, 15, 16, 18–20, inclusive, 23, 24, 27 and the antenna 14 may all be of conventional construction and operation so that a detailed explanation of the operation thereof is deemed unnecessary.

*General operation of Fig. 1 radar system*

Considering briefly, however, the operation of the Fig. 1 radar system as a whole, the synchronizing circuits 10 periodically apply to the modulator 11 trigger pulses having a repetition frequency determined by the frequency of the repetition rate oscillator of the unit 10. For convenience, the arrows represent the direction of signal propagation. The trigger pulses from the unit 10 periodically fire the modulator 11, which, in turn, pulse-modulates the output signal of the transmitter 12 and causes the transmitter to apply to the antenna 14 through the duplexer 13 periodic bursts of high-frequency wave-signal energy. During the operation of the transmitter 12, the duplexer 13 protects the receiver 15 from being overloaded by the transmitted pulses. During the intervals between transmitted pulses, the receiver 15 responds to any echo signals intercepted by the antenna 14, detects the modulation components of these signals and applies the detected signals to the plan-position indicator 16.

Output pulses of the modulator 11 are also applied to the gating pulse generator system 17. In response to these pulses, the gating pulse generator system 17 applies repetitive gating pulses to the sweep generator 18. During the intervals of these gating pulses, the sweep generator 18 develops saw-tooth pulses which are applied as a sweep signal to the rotor winding 19a of the synchro 19. Gating pulses are also applied by the gating pulse generator system 17 to the unit 16 to render conductive the cathode-ray tube of that unit during the sweep time of the output signal of the sweep generator 18.

The synchro 19 resolves the signal applied to the rotor winding 19a into two components having amplitudes which individually vary in accordance with the sine and cosine of the angle of the rotor winding 19a relative to a predetermined reference. The component of the sweep signal developed across the stator winding 19b is amplified by the sweep amplifier 20 and applied through the coupling condenser 21, the automatic potential-control system 22 and sweep amplifier 23 to one deflection circuit of the plan-position indicator 16. The other component of the sweep signal developed across the stator winding 19c is amplified in a similar manner and applied through the sweep amplifier 24, the coupling condenser 25, the automatic potential-control system 26 and the sweep amplifier 27 to the other deflection circuit of the plan-position indicator 16. The components of the sweep signal applied to the deflection circuits of the plan-position indicator 16 deflect the cathode-ray beam of the indicator 16 in a usual manner to develop on the screen thereof a plan view of the area being scanned by the radar apparatus.

*Description of Fig. 1 automatic potential-control system*

Referring now more particularly to the unit 22 of the Fig. 1 radar system, that unit comprises a control system for automatically maintaining the potential at a given point 28 in the radar system at a predetermined value, for example, zero potential, during the intervals intervening the gating intervals established by the gating pulse generator system 17. The control system comprises a potential-supply circuit, namely, a source of unidirectional potential having a negative terminal —B and a positive terminal +B. The potential-control system also includes a two-part voltage divider coupled in a series relation with the potential-supply circuit and preferably having the above-mentioned given point 28 intermediate the two parts. One part of the voltage divider includes potential-responsive first circuit means of variable impedance for controlling current flow therethrough. More particularly, the potential-responsive circuit means comprises a first electron-discharge device of variable impedance, namely, a tube 29 for controlling current flow through the first voltage-divider part. The anode of the tube 29 is directly connected to the source +B, while the control electrode of the tube 29 is coupled through a resistor 31 for suppressing parasitic oscillations to a point on a voltage divider comprising a resistor 32, a resistor 33 and a parallel-connected high-frequency by-pass condenser 34, and a resistor 35 coupled in a series relation between a source —B' and the source +B. The cathode of the tube 29 is coupled to a second electron-discharge device, specifically, a diode 36, included in means to be described subsequently and coupled between the source +B and the given point 28 in a series relation with the first electron-discharge device 29 and with a predetermined polarity for completely interrupting current flow through the first voltage-divider part. The junction of the cathode of the tube 29 and the anode of the diode 36 is coupled through a resistor 37 to the source —B.

The other part of the voltage divider includes a second circuit means of substantial impedance. A potential-responsive third circuit means is coupled between the potential-supply circuit and the given point. More particularly, this potential-responsive third circuit means includes a unidirectionally conductive device, specifically, a diode 38 which is coupled between the source —B and the given point 28 with the same polarity as the diode 36 is coupled between the given point 28 and the source +B. The above-mentioned second circuit means comprises an element of substantial impedance, namely, a resistor 39 series-connected between the cathode of the diode 38 and the source —B.

The potential-supply circuit may also be considered to comprise the source +B, —B, the tube 29, and the resistor 39 and in such case the potential-supply circuit has a controllable potential-current flow characteristic. The potential-control system further includes a gating circuit for applying to the above-mentioned potential-responsive third circuit means repetitive potential pulses for rendering the same nonconductive. Means including the aforesaid third circuit means also is provided for isolating the given point 28 from the potential-supply circuit +B, —B during the gating intervals. This means also includes diode 36. The gating circuit includes a tube 40 having a control electrode coupled through a current-limiting resistor 41 to the output circuit of the gating pulse generator system 17. The cathode of the tube 40 is connected to a condenser 43 and is coupled through a cathode resistor 42 and the resistor 39 to the source —B. The anode of the tube 40 is directly connected to the source +B.

The gating circuit also includes a tube 44 having a control electrode coupled through a current-limiting resistor 45 to the output circuit of the gating pulse generator system 17. The cathode of the tube 44 is coupled through a cathode resistor 46 to the source —B and the anode thereof is directly connected to the source +B. The gating circuit further includes a tube 47 having a control electrode coupled to a voltage divider comprising a resistor 48 and a resistor 53 having a parallel-connected high-frequency by-pass condenser 54 coupled between a source —B' and the output circuit of unit 17. The anode of the tube 47 is connected to the junction of the resistors 33 and 35 and the cathode thereof is directly connected to the source —B.

The automatic potential-control system 22 also includes a circuit, coupled between the given point 28 and the first circuit means comprising the tube 29, responsive to deviations of the potential at the given point from the above-mentioned predetermined value during the intervening intervals for controlling the impedance of the first circuit means to maintain the potential at the given point at the predetermined value during the intervening intervals. More particularly, this circuit comprises a feed-back circuit including an electron-discharge amplifier tube 49 having a cathode coupled to the source —B through a resistor 46, a control electrode coupled to the given point 28 and an anode coupled to the first circuit means, specifically, to the control electrode of the tube 29 through resistors 31 and 33 for applying thereto deviations of the potential at the given point 28 from the predetermined value during the intervening intervals for controlling the impedance of the tube 29 relative to the impedance of the tube 38 and the resistor 39. The gating circuit tube 44 is coupled to the feed-back circuit, in particular to the cathode of the tube 49, for applying thereto repetitive gating pulses for preventing control-electrode current flow in the tube 49 during the gating intervals.

A tube 50 also included in the unit 22 has an anode connected to the source +B, a cathode coupled through the resistor 46 to the source —B, and a control electrode coupled to an adjustable voltage divider 51 which is coupled through a resistor 52 between the source —B and ground for controlling the predetermined value of the potential at the point 28 during the intervening intervals, as will be explained more fully subsequently.

*Operation of Fig. 1 automatic potential-control system*

The operation of the automatic potential-control system of Fig. 1 may best be understood by referring to Fig. 2 of the drawings which is a graph representing the potential-time characteristics of the output signals of the various units of Fig. 1 radar system. Curve A of Fig. 2 represents the output signal of the unit 17 which comprises repetitive positive pulses and is applied as a gating signal to the control electrodes of tubes 40, 44 and 47 of the potential-control system 22. Assume for the moment that prior to a time $t_0$ the tubes 40, 44 and 47 have been nonconductive and that the tubes 38, 36, 29, 49 and 50 have been conductive. The first positive gating pulse then occurs during a time interval $t_0$—$t_2$ to render conductive the tubes 40, 44 and 47. Current flow from the source +B through the tube 40 and the resistors 39 and 42 to the source —B raises the potential at the junction of the resistors 39 and 42 sufficiently to render nonconductive the diode 38. Similarly, current flow from the source +B through the tube 44 and the resistor 46 to the source —B raises the potential at the cathodes of the tubes 49 and 50 sufficiently to prevent control-electrode current flow in the tube 49 during the interval $t_0$—$t_2$. Further, current flow from the source +B through the resistor 35 and the tube 47 to the source —B lowers to a negative value the potential at the junction of the resistors 33 and 35 and, hence, lowers the potential at the control electrode of the tube 29. This decrease in potential increases the impedance of the tube 29 relative to the resistance of the resistor 37 and renders the diode 36 nonconductive because of the negative potential then applied to the anode of the diode through the resistor 37 from the source —B. Since the diodes 36 and 38 and control electrode of the tube 49 are nonconductive during the gating interval $t_0$—$t_2$, the point 28 is isolated from the sources —B and +B during that interval. Also, the operation of the tube 47 renders the tube 49 nonconductive during the interval $t_0$—$t_2$.

During the gating intervals, the sweep amplifier 20 applies to the sweep amplifier 23 through the condenser 21 repetitive saw-tooth pulses, having, for example, polarity and magnitude as represented by curve B, the first of which sweeps from a negative to a positive potential during a time interval $t_0$—$t_1$. Although the condenser 21 is a large coupling condenser, that condenser charges somewhat through the input impedance of the sweep amplifier 23 during the sweep time of the signal represented by curve B. Accordingly, assuming for the moment that the potential at the point 28 is zero at the time $t_0$, curve C then represents the signal developed at the point 28. Note from curve C that due to the incremental charge developed on the condenser 21 during the sweep time, the signal developed at the point 28 has a somewhat distorted positive peak. Accordingly, during the time interval $t_1$—$t_2$, when the signal represented by curve B falls to its initial negative potential, the signal developed at the point 28 falls below zero potential, as represented by curve C, by an amount equal to the difference in the peak positive amplitudes of the signals represented by curves B and C.

Since the condenser 21 also acquires incremental charges during the application of successive saw-tooth pulses thereto, in the absence of the unit 22 these incremental charges would become cumulative and result in an instability in the operation of the sweep amplifier 23 and in the display on the cathode-ray tube screen of the plan-position indicator 16.

To avoid such instability, during the intervals intervening the gating intervals, for example, during the interval $t_2$—$t_3$, the potential-control system 22 automatically maintains the potential at the point 28 at a predetermined value, for instance, zero potential. At the time $t_2$ the first gating pulse of curve A terminates, rendering the tubes 40, 44 and 47 nonconductive during the interval $t_2$—$t_3$. Accordingly, the potential at the junction of the resistors 33 and 35 rises due to the cessation of current flow through the tube 47, and the potential at the cathode of the tube 49 drops due to cessation of current flow through the tube 44. The tube 49 then conducts, but as tube 47 is made non-conductive, a resultant decrease in current flow through the resistor 35 occurs so that the potential at the anode of the tube 49 rises from a negative to a positive value, as represented by curve D of Fig. 2. Accordingly, the potential at the control electrode of the tube 29 rises causing that tube to become more conductive. Current flow from the source +B through the tube 29 and the resistor 37 to the source —B causes the potential at the anode of the tube 36 to rise sufficiently to render that tube conductive.

During the interval $t_2$—$t_3$, the discontinuance of current flow from the source +B through the tube 40 and the resistors 42 and 39 to the source —B causes the potential at the cathode of the diode 38 to fall below the anode potential thereof, thus causing tube 38 to conduct. The discharge current from the condenser 43 through the resistors 42 and 39 causes a slight delay in the fall of the potential at the cathode of the tube 38 to allow current flow from the source +B through the tubes 29 and 36 to the point 28 and the condenser 21 slightly before the tube 38 is rendered conductive. Current then flows during the interval $t_2$—$t_3$ from the source +B through tubes 29, 36 and 38 and the resistor 39 to the source —B and also through the tube 29 and the resistor 37 to the source —B.

Since the potential at the point 28 and the control electrode of the tube 49 is negative at the time $t_2$, as represented by curve C, and, hence, below the assumed predetermined value of zero potential, the anode potential of the tube 49 is higher than the quiescent value thereof when the potential at the point 28 is zero during the intervals intervening the gating intervals. Accordingly, at the time $t_2$, the potential at the control electrode of the tube 29 is higher than the quiescent value thereof during the intervening intervals and, hence, the impedance of the tube 29 is less than its quiescent value during the intervening intervals. Thus, because of the reduced impedance of the tube 29 relative to the impedance of the resistor 39; the potential at the point 28 rises rapidly to zero potential during the interval $t_2$—$t_3$, as represented by the negative peak of the signal of curve C. The time required for the potential at the point 28 to rise from a negative to zero potential is determined by the time constant of the condenser 21 and the output impedance of the unit 22. The unit 22 has a very low output impedance because of the feed-back circuit which applies a degenerative feed-back signal through the amplifier 49 to the control electrode of the tube 29.

From the foregoing explanation of the operation of the automatic potential-control system 22, it will be understood that during the intervals intervening the gating intervals the tube 49 amplifies any deviations of the potential at the point 28 from the predetermined value thereof and degeneratively applies the amplified signal to the variable impedance tube 29 to alter the impedance thereof and thus to cause the potential at the point 28 rapidly to return to the predetermined value. Accordingly, a sharp positive peak appears in the signal developed at the anode of the tube 49, represented by curve D, as a result of the negative peak of the signal, represented by curve C, and applied to the control electrode of the tube 49.

Further, it will be understood that under operating conditions which cause the potential at the point 28 to rise above the predetermined value during the intervals intervening the gating intervals, the feed-back circuit functions in a manner similar to that just described and causes the potential at the control electrode of the tube 29 to be more negative than its quiescent value during the intervening intervals, thus increasing the impedance of the tube 29 relative to the impedance of the resistor 39 and causing the potential at the point 28 rapidly to fall to the predetermined value thereof.

The predetermined value of the potential at the point 28 during the intervening intervals may be controlled by adjustment of the voltage divider 51 which determines the control-electrode potential of the tube 50. A change in the control-electrode potential of the tube 50 changes the cathode potential of the tube 49, causing the anode potential of that tube to change and thus altering the impedance of the tube 29. The change in the impedance of the tube 29 results in the determination of a new predetermined value for the potential at the point 28 during the intervening intervals.

While applicant does not wish to be limited to any particular circuit constants, the following have been employed in a potential-control system constructed in accordance with Fig. 1:

| | |
|---|---|
| Condenser 21 | .1 microfarad |
| Condenser 34 | 15 micromicrofarads |
| Condenser 43 | 820 micromicrofarads |
| Condenser 54 | 39 micromicrofarads |
| Resistor 31 | 220 ohms |
| Resistor 32 | 1.75 megohms |
| Resistor 33 | 500 kilohms |
| Resistor 35 | 150 kilohms |
| Resistor 37 | 150 kilohms |
| Resistor 39 | 28 kilohms |
| Resistor 41 | 4.7 kilohms |
| Resistor 42 | 2.2 kilohms |
| Resistor 45 | 100 kilohms |
| Resistor 46 | 150 kilohms |
| Resistor 48 | 220 kilohms |
| Resistor 51 | 10 kilohms |
| Resistor 52 | 500 kilohms |
| Resistor 53 | 270 kilohms |
| Tube 29 | ½ section of Type 12AT7 |
| Tube 36 | ½ section of Type 6AL5 |
| Tube 38 | ½ section of Type 6AL5 |
| Tube 40 | ½ section of Type 12AU7 |
| Tube 44 | ½ section of Type 12AU7 |
| Tube 47 | ½ section of Type 12AT7 |
| Tube 49 | ½ section of Type 5691 |
| Tube 50 | ½ section of Type 5691 |
| Source +B | +220 volts |
| Source —B | —180 volts |
| Source —B' | —350 volts |

From the foregoing description it will be apparent that an automatic potential-control system constructed in accordance with the invention has the advantage of isolating a point in the system from a potential-supply circuit during predetermined gating intervals and of providing a low output impedance for automatically maintaining the potential at that point at a predetermined value during intervals intervening the gating intervals.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a gated system having one operating phase during predetermined gating intervals and another operating phase during the intervening intervals; a control system for automatically maintaining the potential at a given point in the gated system at a predetermined value during the intervening intervals comprising: a source of unidirectional potential; a two-part voltage divider coupled in a series relation with said source, said given point being intermediate said two parts, one part including a first electron tube of variable impedance for controlling current flow therethrough and a diode coupled in a series relation with said electron tube between said source and said given point with a predetermined polarity for interrupting current flow through said one part and the other part including an element of substantial impedance and a diode coupled between said source and said given point with the same polarity in a series relation with said substantial impedance element for interrupting current flow therethrough; a gating circuit for applying to said diodes repetitive gating potential pulses for rendering said diodes nonconductive to isolate said given point from said source during said gating intervals; and a feed-back circuit comprising an amplifier having a control electrode coupled to said given point and an anode coupled to said first electron tube for applying thereto deviations of the potential at said point from said predetermined value during said intervening intervals to control the impedance of said first electron tube relative to the impedance of said substantial impedance element and to maintain said potential at said predetermined value during said intervening intervals, said gating circuit also being coupled to said feed-back circuit for applying thereto repetitive gating pulses for rendering said feed-back circuit inoperative during said gating intervals.

2. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, one part including potential-responsive first circuit means of variable impedance for controlling current flow therethrough and the other part including a second circuit means of substantial impedance; potential-responsive third circuit means coupled between said potential-supply circuit and said given point; a circuit for applying to said third circuit means repetitive gating potential pulses for rendering the same nonconductive; means including said third circuit means for isolating said given point from said supply circuit within the control system during said gating intervals; and a circuit coupled between said given point and said first circuit means and responsive to deviations of the potential at said point from said predetermined value during said intervening intervals for applying to said first circuit means a control potential variable in magnitude during said intervening intervals and determined during said intervening intervals by said potential at said given point for controlling the impedance of said first circuit means to maintain said potential at said given point at said predetermined value during said intervening intervals.

3. In a gated system having one operating phase during predetermined gating intervals and another operating phase during the intervening intervals, a control system for automatically maintaining the potential at a given point in the gated system at a predetermined value during the intervening intervals comprising: a source of unidirectional potential; a two-part voltage divider coupled in a series relation with said source, one part including potential-responsive first circuit means of variable impedance for controlling current flow therethrough and the other part including a second circuit means of subtantial impedance; potential-responsive third circuit means coupled between said source and said given point; a circuit for applying to said third circuit means repetitive gating potential pulses for rendering the same nonconductive; means including said third circuit means for isolating said given point from said source within the control system during said gating intervals; and a circuit coupled between said given point and said first circuit means and responsive to deviations of the potential at said point from said predetermined value during said intervening intervals for applying to said first circuit means a control potential variable in magnitude during said intervening intervals and determined during said intervening intervals by said potential at said given point for controlling the impedance of said first circuit means to maintain said potential at said given point at said predetermined value during said intervening intervals.

4. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, one part including potential-responsive first circuit means comprising an electron-discharge device of variable impedance for controlling current flow therethrough and the other part including a second circuit means of substantial impedance; potential-responsive third circuit means coupled between said potential-supply circuit and said given point; a circuit for applying to said third circuit means repetitive gating potential pulses for rendering the same nonconductive; means including said third circuit means for isolating said given point from said supply circuit within the control system during said gating intervals; and a circuit coupled between said given point and said electron-discharge device and responsive to deviations of the potential at said point from said predetermined value during said intervening intervals for applying to said electron-discharge device a control potential variable in magnitude during said intervening intervals and determined during said intervening intervals by said potential at said given point for controlling the impedance of said electron-discharge device to maintain said potential at said given point at said predetermined value during said intervening intervals.

5. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, one part including a first electron-discharge device of variable impedance and a second electron-discharge device coupled in a series relation therewith for interrupting current flow through said one part and the other part including circuit means of substantial impedance and including potential-responsive circuit means coupled between said potential-supply circuit and said given point; a circuit for applying to said second electron-discharge device and to said potential-responsive circuit means repetitive gating potential pulses for rendering said second electron-discharge device and said potential-responsive circuit means nonconductive; means including said second electron-discharge device and said potential-responsive circuit means for isolating said given point from said supply circuit within the control system during said gating intervals; and a circuit coupled between said given point and said first electron-discharge device and responsive to deviations of the potential at said point from said predetermined value during said intervening intervals for applying to said first electron-discharge device a control potential variable in magnitude during said intervening intervals and determined during said intervening intervals by said potential at said given point for controlling the impedance of said first electron-discharge device to maintain said potential at said given point at said predetermined value during said intervening intervals.

6. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, said given point being intermediate said two parts; one part including an electron tube of variable impedance for controlling current flow therethrough and a diode for interrupting current flow through said one part and the other part including circuit means of substantial impedance and including potential-responsive circuit means coupled between said supply circuit and said given point; a circuit for applying to said diode and said potential-responsive circuit means repetitive gating potential pulses for rendering said diode and said potential-responsive circuit means nonconductive; means including said diode and said potential-responsive circuit means for isolating said given point from said supply circuit within the control system during said gating intervals; and a circuit coupled between said given point and said electron tube and responsive to deviations of the potential at said point from said predetermined value during said intervening intervals for applying to said electron tube a control potential variable in magnitude during said intervening intervals and determined during said intervening intervals by said potential at said given point for controlling the impedance of said electron tube to maintain said potential at said given point at said predetermined value during said intervening intervals.

7. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, said given point being intermediate said two parts, one part including potential-responsive circuit means of variable impedance for controlling current flow therethrough and the other part including an element of substantial impedance and a series-connected unidirectionally conductive device coupled between said potential-supply circuit and said given point for interrupting current flow through said other part; device repetitive gating potential pulses for rendering the same nonconductive; means including said device for isolating said given point from said supply circuit within the control system during said gating intervals; and a circuit coupled between said given point and said circuit means and responsive to deviations of the potential at said point from said predetermined value during said intervening intervals for applying to said circuit means a control potential variable in magnitude during said intervening intervals and determined during said intervening intervals by said potential at said given point for controlling the impedance of said circuit means relative to the impedance of said substantial impedance element to maintain said potential at said given point at said predetermined value during said intervening intervals.

8. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, said given point being intermediate said two parts, one part including potential-responsive first circuit means of variable impedance and a diode coupled between said supply circuit and said given point with a predetermined polarity for interrupting current flow therethrough and the other part including a second circuit means of substantial impedance and a diode coupled between said supply circuit and said given point with the same polarity for interrupting current flow therethrough; a circuit for applying to said two diodes repetitive gating potential pulses for rendering the same nonconductive; means including said diodes for isolating said given point from said supply circuit within the control system during said gating intervals; and a circuit coupled between said given point and said first circuit means and responsive to deviations of the potential at said point from said predetermined value during said intervening intervals for applying to said first circuit means a control potential variable in magnitude during said intervening intervals and determined during said intervening intervals by said potential at said given point for controlling the impedance of said first circuit means to maintain said potential at said given point at said predetermined value during said intervening intervals.

9. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, one part including potential-responsive first circuit means of variable impedance for controlling current flow therethrough and the other part including a second circuit means of substantial impedance; potential-responsive third circuit means coupled between said potential-supply circuit and said given point; a gating circuit for applying to said third circuit means repetitive gating potential pulses for rendering the same nonconductive; means including said third circuit means for isolating said given point from said supply circuit within the control system during said gating intervals; and a feed-back circuit coupled between said given point and said first circuit means and responsive to deviations of the potential at said point from said predetermined value during said intervening intervals for applying to said first circuit means a control potential variable in magnitude during said intervening intervals and determined during said intervening intervals by said potential at said given point for controlling the impedance of said first circuit means to maintain said potential at said given point at said predetermined value during said intervening intervals, said gating circuit also being coupled to said feed-back circuit for applying thereto repetitive gating pulses for rendering said feed-back circuit inoperative during said gating intervals.

10. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, one part including potential-responsive first circuit means of variable impedance for controlling current flow therethrough and the other part including a second circuit means of substantial impedance; potential-responsive third circuit means coupled between said potential-supply circuit and said given point; a circuit for applying to said third circuit means repetitive gating potential pulses for rendering the same nonconductive; means including said third circuit means for isolating said given point from said supply circuit within the control system during said gating intervals; and a feed-back circuit comprising an electron-discharge amplifier tube having a cathode coupled to said potential-supply circuit, a control electrode coupled to said given point and an anode coupled to said first circuit means for applying thereto deviations of the potential at said point from said predetermined value during said intervening intervals to control the impedance of said first circuit means and to maintain said potential at said given point at said predetermined value during said intervening intervals.

11. In a gated system having one operating phase during predetermined gating intervals and another operating phase during the intervening intervals, a control system for automatically maintaining the potential at a given point in the gated system at a predetermined value during the intervening intervals comprising: a potential-supply circuit; a two-part voltage divider coupled in a series relation with said potential-supply circuit, said given point being intermediate said two parts, one part including potential-responsive first circuit means of variable impedance for controlling current flow therethrough and the other part including a second circuit means of substantial impedance; potential - responsive third circuit means included in said voltage divider and coupled between said potential-supply circuit and said given point; a circuit for applying to said third circuit means repetitive gating potential pulses for rendering the same nonconductive; means including said third circuit means for isolating said given point from said supply circuit within the control system during said gating intervals; and a circuit coupled between said given point and said first circuit means and responsive to deviations of the potential at said point from said predetermined value during said intervening intervals for applying to said first circuit means a control potential variable in magnitude during said intervening intervals and determined during said intervening intervals by said potential at said given point for controlling the impedance of said first circuit means to maintain said potential at said given point at said predetermined value during said intervening intervals.

12. In a gated system having one operating phase during predetermined gating intervals and another operating phase during the intervening intervals, a control system for automatically maintaining the potential at a given point in the gated system at a predetermined value during the intervening intervals comprising: a signal-responsive potential-supply circuit having a controllable potential-current flow characteristic; signal-responsive circuit means coupled in circuit with said supply circuit and said given point; a circuit for supplying to said circuit means repetitive gating pulses for rendering the same nonconductive; means including said circuit means for isolating said given point from said potential supply circuit within the control system during said gating intervals; and a circuit coupled to said given point and said supply circuit and responsive to deviations of the potential at said point from said predetermined value during said intervening intervals for applying to said potential-supply circuit a control signal variable in magnitude during said intervening intervals and determined during said intervening intervals by said potential at said given point for controlling said characteristic of said potential supply circuit to maintain said potential at said given point at said predetermined value during said intervening intervals.

References Cited in the file of this patent

UNITED STATES PATENTS

| Number | Name | Date |
|---|---|---|
| 2,491,029 | Brunn | Dec. 13, 1949 |
| 2,577,536 | MacNichol | Dec. 4, 1951 |